United States Patent
Boehme

(10) Patent No.: US 12,351,057 B2
(45) Date of Patent: Jul. 8, 2025

(54) PROTECTION DEVICE FOR AN ELECTRIC DC GRID, ON-BOARD ELECTRICAL SYSTEM FOR A VEHICLE, VEHICLE, AND DC CHARGING STATION

(71) Applicant: Mercedes-Benz Group AG, Stuttgart (DE)

(72) Inventor: Urs Boehme, Ehningen (DE)

(73) Assignee: Mercedes-Benz Group AG, Stuttgart (DE)

( * ) Notice: Subject to any disclaimer, the term of this patent is extended or adjusted under 35 U.S.C. 154(b) by 607 days.

(21) Appl. No.: 17/783,216

(22) PCT Filed: Dec. 9, 2020

(86) PCT No.: PCT/EP2020/085318
§ 371 (c)(1),
(2) Date: Jun. 7, 2022

(87) PCT Pub. No.: WO2021/122234
PCT Pub. Date: Jun. 24, 2021

(65) Prior Publication Data
US 2023/0018999 A1  Jan. 19, 2023

(30) Foreign Application Priority Data
Dec. 18, 2019 (DE) .................. 10 2019 008 833.6

(51) Int. Cl.
*B60L 53/60* (2019.01)
*B60L 3/00* (2019.01)
(Continued)

(52) U.S. Cl.
CPC ............. *B60L 53/60* (2019.02); *B60L 3/0069* (2013.01); *B60L 3/04* (2013.01); *B60L 53/11* (2019.02);
(Continued)

(58) Field of Classification Search
CPC ........ B60L 53/11; B60L 53/60; B60L 3/0069; B60L 3/04; H02J 7/0029
See application file for complete search history.

(56) References Cited

U.S. PATENT DOCUMENTS 9,991,783 B2 * 6/2018 Voegele ................. H02M 1/32
2013/0207619 A1 8/2013 Viancino et al.

FOREIGN PATENT DOCUMENTS

DE  10 2009 055 053 A1  6/2011
DE  10 2017 009 352 A1  4/2018
(Continued)

OTHER PUBLICATIONS

German-language European Office Action issued in European application No. 20 823 786.7-1202 dated Jan. 18, 2023 (Six (6) pages).
(Continued)

*Primary Examiner* — Robert Grant
(74) *Attorney, Agent, or Firm* — Crowell & Moring LLP

(57) ABSTRACT

A protection device for an electric DC grid includes a first protection circuit part including a series circuit consisting of a first discharge resistor and a first protection switch between a positive potential line and a reference potential line and a second protection circuit part including a series circuit consisting of a second discharge resistor and a second protection switch between a negative potential line and the reference potential line. The first and second protection switches can be actuated to close if a first and/or second voltage measuring device ascertains that a specified voltage value has been undershot and/or exceeded or the first and/or second protection switch can be actuated to close in an event of a fault current measured by a fault-current measuring device.

8 Claims, 12 Drawing Sheets

(51) Int. Cl.
    *B60L 3/04*     (2006.01)
    *B60L 53/10*    (2019.01)
    *B60R 16/03*    (2006.01)
    *H02J 7/00*     (2006.01)
    *H02H 9/04*    (2006.01)

(52) U.S. Cl.
    CPC ............ *B60R 16/03* (2013.01); *H02J 7/0029* (2013.01); *H02H 9/041* (2013.01)

(56) References Cited

FOREIGN PATENT DOCUMENTS

| | | |
|---|---|---|
| DE | 10 2017 009 355 A1 | 4/2018 |
| DE | 10 2018 116 055 B3 | 10/2019 |
| EP | 2 570 289 A1 | 3/2013 |
| JP | 2008-312403 A | 12/2008 |

OTHER PUBLICATIONS

PCT/EP2020/085318, International Search Report dated Mar. 1, 2021 (Two (2) pages).

German-language German Office Action issued in German application No. 10 2019 008 833.6 dated Aug. 12, 2021 (Seven (7) pages).

\* cited by examiner

PROTECTION DEVICE FOR AN ELECTRIC DC GRID, ON-BOARD ELECTRICAL SYSTEM FOR A VEHICLE, VEHICLE, AND DC CHARGING STATION

BACKGROUND AND SUMMARY OF THE INVENTION

The invention relates to a protection device for an electric DC grid, an on-board electrical system for a vehicle, a vehicle, and a DC charging station.

As described in DE 10 2017 009 355 A1, a method for operating on-board electrical systems is known from the prior art. In the method for operating a first on-board electrical system with a first electrical DC voltage applied to it and a second on-board electrical system with a second electrical DC voltage applied to it, the first and the second on-board electrical systems are electrically coupled by means of an energy coupler having a first metered energy converter. The first and the second electrical DC voltages are electrically insulated from any electrical reference potential by means an electrical insulation device. The electrical insulation device is monitored. The first and the second on-board electrical systems are galvanically coupled by means the energy coupler. If the insulation device is faulty in an area of one of the two on-board electrical systems, the energy coupler controls electrical potentials of the other of the two on-board electrical systems respectively such that any potential differences of these electrical potentials from the reference potential are less than a specified comparative value.

DE 10 2017 009 352 A1 describes an energy coupler for electrically coupling on-board electrical systems and a method for electrically coupling on-board electrical systems. The energy coupler for electrically coupling a first on-board electrical system with a first electrical DC voltage applied to it to a second on-board electrical system with a second electrical DC voltage applied to it has a first metered energy converter and a second metered energy converter. The first and the second metered energy converters each have an on-board electrical system connection and an intermediate circuit connection. The on-board electrical system connection of the first metered energy converter is connected to the first on-board electrical system and the on-board electrical system connection of the second metered energy converter is connected to the second on-board electrical system. The intermediate circuit connections of the first and the second metered energy converters are connected to a joint DC voltage intermediate circuit. A first electrical potential of the DC voltage intermediate circuit is electrically connected to one of the electrical potentials of the first on-board electrical system by means of the first metered energy converter, and a second electrical potential of the DC voltage intermediate circuit is electrically connected to one of the electrical potentials of the second on-board electrical system by means of the second metered energy converter.

The problem underlying the invention is providing a protection device for an electric DC grid which is an improvement on the prior art, an on-board electrical system for a vehicle which is an improvement on the prior art, a vehicle with such an on-board electrical system and a DC charging station which is an improvement on the prior art.

A protection device for an electric DC grid according to the invention, in particular for a high-voltage grid, for example for an on-board electrical system of a vehicle, comprises a first voltage measuring device between a positive potential line and a reference potential line for measuring a voltage between the positive potential line and the reference potential line and a second voltage measuring device between a negative potential line and the reference potential line for measuring a voltage between the negative potential line and the reference potential line. The reference potential is, in particular, an electric mass potential, in particular a vehicle chassis potential when the protection device is used in a vehicle, and, for example, an earth potential when the protection device is used in a DC charging station.

The protection device also comprises a protection circuit. The protection circuit comprises, for example, an electric series circuit consisting of a discharge resistor and a first protection switch between the positive potential line and the reference potential line and an electric series circuit consisting of the discharge resistor and a second protection switch between the negative potential line and the reference potential line. Alternatively, the protection circuit comprises two protection circuit parts, wherein the first protection circuit part comprises an electric series circuit consisting of a first discharge resistor and a first protection switch between the positive potential line and the reference potential line, and the second protection circuit part comprises an electric series circuit consisting of a second discharge resistor and a second protection switch between the negative potential line and the reference potential line.

In both variations of the protection circuit of the protection device, the first protection switch can be actuated so as to close if the first voltage measuring device ascertains that a specified voltage value has been undershot, and the second protection switch can be actuated so as to close if the second voltage measuring device ascertains that the specified voltage value has been undershot.

Alternatively, the first protection switch can be actuated so as to close if the second voltage measuring device ascertains that a specified voltage value has been exceeded, and the second protection switch can be actuated so as to close if the first voltage measuring device ascertains that a specified voltage value has been exceeded.

Alternatively to the two voltage measuring devices, provision may be made for a fault-current measuring device in the reference potential line. Then, in both variations of the protection circuit, the first protection switch and/or the second protection switch can be actuated so as to close in the event of a fault current measured by means of the fault-current measuring device.

An electric on-board electrical system according to the invention, in particular a high-voltage on-board electrical system, for a vehicle, in particular for an electric vehicle or hybrid vehicle, comprises such a protection device.

A vehicle according to the invention, in particular an electric vehicle or hybrid vehicle, comprises such a protection device, in particular such an on-board electrical system, in particular a high-voltage on-board electrical system, with such a protection device.

A DC charging station according to the invention, in particular a DC charging station outside the vehicle, in particular a high-voltage DC charging station, in particular for the electrical charging of a vehicle, in particular of an electric vehicle or hybrid vehicle, in particular of a high-voltage battery of such a vehicle, comprises such a protection device.

The term "high-voltage" is understood to mean, in particular, an electric DC voltage which, in particular, is greater than about 60 V. In particular, the term "high-voltage" is to be interpreted in accordance with standard ECE R 100.

The solution according to the invention solves the problems associated with Y capacitors in vehicles, in particular in electric vehicles and hybrid vehicles, and in DC charging stations, as explained below. Such Y capacitors are used as measures to reduce the emission of EMC interference (EMC=electromagnetic compatibility). However, they represent an increased potential risk in terms of their high-voltage safety. For example, the standards SAE J1772, IEC60479-1 and -2 specify a charge quantity contained in the Y capacitors as a feature that is a health risk (C1 characteristic curve). As the operating voltage of the vehicle increases, it becomes more and more difficult to keep within the limit values required under these standards. In some cases, alternative measures for meeting safety regulations, such as greater, in particular double, electric insulation, are not permitted. The further standard LV123 and standards associated with it prescribe, for example, a maximum energy content of 0.2 J for the charge quantity of all Y capacitors. If a way out using the alternative measurements were allowed, then, for example, the already mentioned greater, in particular double, electric insulation could be used. However, this could only be implemented if all high-voltage systems which are coupled to one another have correspondingly greater insulation. In other words, for example, during DC charging, both the vehicle and the DC charging station, in particular the charging column, would have to have correspondingly greater insulation. However, since there is no compulsory standard for this, couplings of systems with different insulation designs would also be possible, so the safety requirements would not be met.

This problem is solved by the invention described because, through a voltage measurement of each high-voltage potential compared to the reference potential, in particular the mass potential, a shift of the high-voltage potentials with respect to the reference potential is detected, this possibly being the consequence of a body current, in other words the consequence of, in particular human, bodily contact with one of the high-voltage potentials and with the reference potential. In order to reduce the voltage as rapidly as possible in the high-voltage potential concerned, in which the voltage is reduced compared to the reference potential, the discharge resistor and, advantageously electrically parallel thereto, an uncharged protection capacitor are connected. The voltage between the high-voltage potential concerned compared to the reference potential thereby suddenly jumps to a much lower level, as a result of which the body current reduces proportionally to the voltage. The solution according to the invention therefore makes it possible to reduce an electric shock caused to the body, in particular the human body, by the Y capacitors. The requirements described above can therefore be met. It is also possible to limit the electrical energy of the Y capacitors realized through body resistor to an amount below 0.2 J even though the energy stored in the Y capacitors may be significantly higher.

As already mentioned above, a protection capacitor is advantageously electrically connected in parallel to the discharge resistor. The discharge resistor on its own would have to be of very low resistance in order to reduce the body current rapidly. However, the disadvantage of this is that low-resistance insulation faults would therefore occur. As a result, the combination of discharge resistor and protection capacitor electrically connected in parallel is much more advantageous. The discharge resistor ensures that the protection capacitor electrically connected in parallel was voltage-free at the time of connection. After connection, it ensures rapid discharging of the Y capacitors of the high-voltage potential concerned.

The protection circuit therefore comprises, for example, the electric series circuit consisting of the discharge resistor and the first protection switch between the positive potential line and the reference potential line and the electric series circuit consisting of the discharge resistor and the second protection switch between the negative potential line and the reference potential line, wherein the protection capacitor is electrically connected in parallel to the discharge resistor. Alternatively, the protection circuit comprises both protection circuit parts, wherein the first protection circuit part comprises the electric series circuit consisting of the first discharge resistor and the first protection switch between the positive potential line and the reference potential line, wherein a first protection capacitor is electrically connected in parallel to the first discharge resistor, and wherein the second protection circuit part comprises the electric series circuit consisting of the second discharge resistor and the second protection switch between the negative potential line and the reference potential line, wherein a second protection capacitor is electrically connected in parallel to the second discharge resistor.

For example, the protection capacitor is not only electrically connected in parallel to the discharge resistor, but an electric series circuit consisting of the protection capacitor and a protection resistor is electrically connected in parallel. The protection resistor is advantageously used to limit a current over the protection capacitor.

The protection circuit therefore comprises, for example, the electric series circuit consisting of the discharge resistor and the first protection switch between the positive potential line and the reference potential line and the electric series circuit consisting of the discharge resistor and the second protection switch between the negative potential line and the reference potential line, wherein the electric series circuit consisting of the protection capacitor and the protection resistor is electrically connected in parallel to the discharge resistor. Alternatively, the protection circuit comprises both protection circuit parts, wherein the first protection circuit part comprises the electric series circuit consisting of the first discharge resistor and the first protection switch between the positive potential line and the reference potential line, wherein an electric series circuit consisting of the first protection capacitor and a first protection resistor is electrically connected in parallel to the first discharge resistor, and wherein the second protection circuit part comprises the electric series circuit consisting of the second discharge resistor and the second protection switch between the negative potential line and the reference potential line, wherein an electric series circuit consisting of the second protection capacitor and a second protection resistor is electrically connected in parallel to the second discharge resistor.

For example, a first voltage evaluation unit coupled to the first voltage measuring device and the first protection switch is provided for evaluating a voltage ascertained by the first voltage measuring device and for actuating the first protection switch if the specified voltage limit value has been undershot, and a second voltage evaluation unit coupled to the second voltage measuring device and the second protection switch is provided for evaluating a voltage ascertained by the second voltage measuring device and for actuating the second protection switch if the specified voltage limit value has been undershot.

Alternatively, for example, a joint voltage evaluation unit coupled to the voltage measuring devices and the protection switches is provided for evaluating the voltage ascertained by the first voltage measuring device and the voltage ascertained by the second voltage measuring device and for actuating the first protection switch if the specified voltage limit value has been undershot by the voltage ascertained by the first voltage measuring device and for actuating the second protection switch if the specified voltage limit value has been undershot by the voltage ascertained by the second voltage measuring device.

If the fault-current measuring device is used, provision is accordingly made, for example, for a current evaluation unit coupled to the fault-current measuring device and the protection switches for evaluating the measured fault current and for actuating the first protection switch and/or the second protection switch depending on the measured fault current.

In one possible embodiment, provision may be made for the joint voltage evaluation unit to be coupled to a third voltage measuring device and to a fourth voltage measuring device, wherein the third voltage measuring device is disposed between the positive potential line and the reference potential line for measuring a voltage between the positive potential line and the reference potential line, and the fourth voltage measuring device is disposed between the negative potential line and the reference potential line for measuring a voltage between the negative potential line and the reference potential line, and wherein a first switch unit is disposed in the positive potential line between a point of connection to the first voltage measuring device and a point of connection to the third voltage measuring device, and a second switch unit is disposed in the negative potential line between a point of connection to the second voltage measuring device and a point of connection to the fourth voltage measuring device. This embodiment is particularly useful for the high-voltage on-board electrical system of an electric vehicle or hybrid vehicle, wherein the first and second switch units are charging protections of the high-voltage on-board electrical system which are closed for DC charging after connection to a DC charging station. Through this solution, it is possible to tell, even before the closure of the switch units, in other words the charging protections, and an increase in the capacitance of the Y capacitors inevitably associated therewith through the parallel connection of the DC charging station and the vehicle, whether the protection circuit would be able to meet legal limit values in the event of faulty insulation, for example in a charging cable.

The respective protection switch is configured, for example, as a semiconductor switch, for example as a MOSFET, IGBT or thyristor.

Exemplary embodiments of the invention are described in more detail below by reference to the drawings.

DETAILED DESCRIPTION OF THE DRAWINGS

Figure 1:
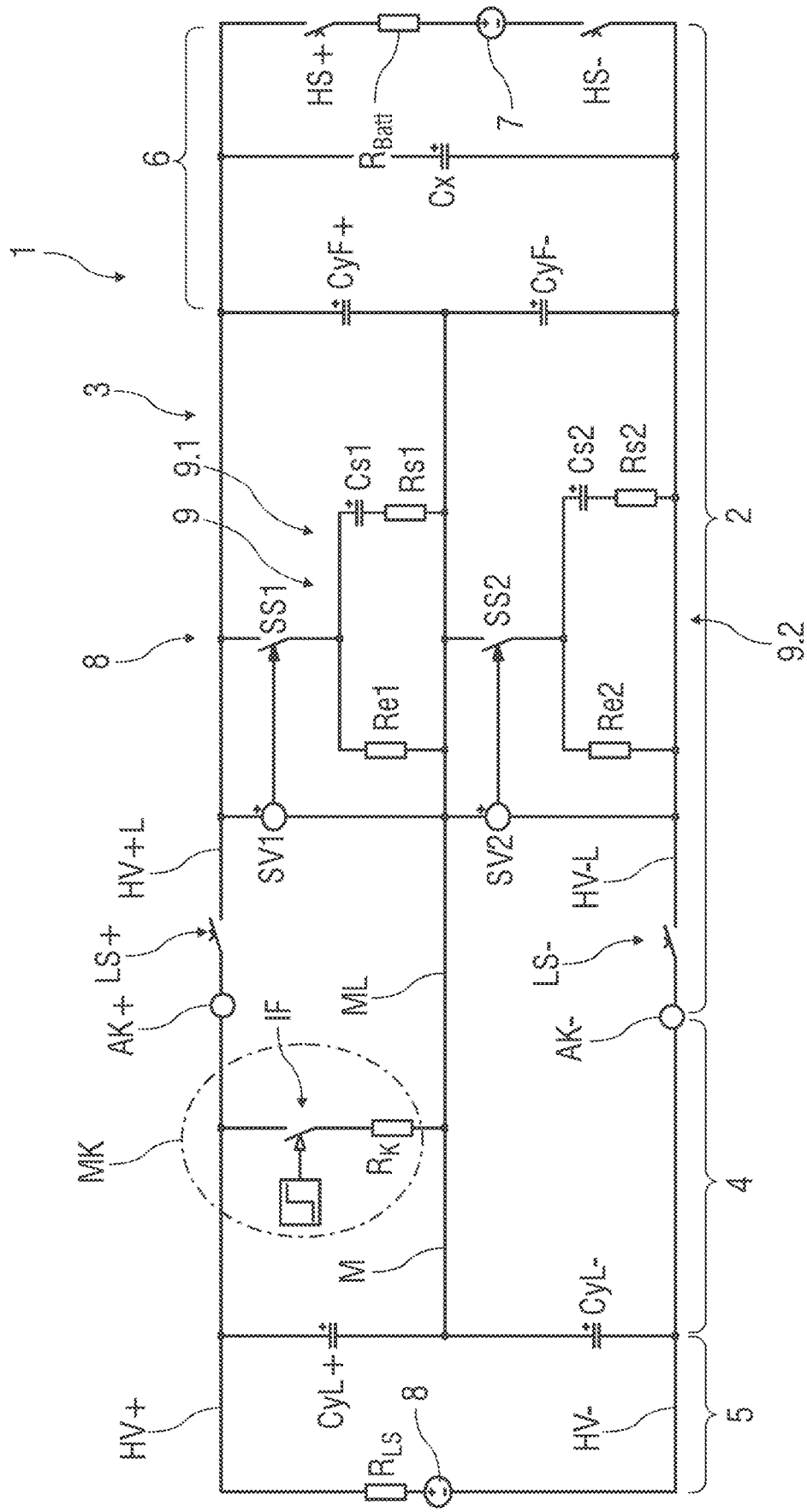
FIG. 1 shows a schematic view of an embodiment of a DC grid with a protection device.

Parts corresponding to one another have been provided with the same reference signs in all of the figures.

A protection device 8 for an electric DC grid 1, in particular for a high-voltage grid, is described by reference to FIGS. 1 to 13 below. In the examples shown, the high-voltage grid is a high-voltage on-board electrical system 3 of a vehicle 2, in particular of an electric vehicle or hybrid vehicle in which the protection device 8 is advantageously used. However, the protection device 8 may alternatively or additionally also be used in a DC charging station 5 to which the vehicle 2 and other vehicles, in particular electric vehicles and hybrid vehicles, can be connected for electrically charging a high-voltage battery 6 of the vehicle 2. The DC grid 1 then comprises, in the connected state of the vehicle 2, the on-board electrical system 3, in particular the high-voltage on-board electrical system 3, of the vehicle 2 and the DC charging station 5. The high-voltage battery 6 of the vehicle 2, which is electrically charged at this DC charging station 5, serves, in particular, to provide electrical energy for at least one electric drive unit of the vehicle 2 for the driving of the vehicle 2.

Y capacitors CyF+, CyF−, CyL+, CyL− are used both in the vehicle 2 and in the DC charging station 5 as a measure for reducing an emission of EMC interference (EMC=electromagnetic compatibility). In particular, Y capacitors CyF+, CyF−, CyL+, CyL− are mostly more efficient and more compact EMC filter measures than inductive interference suppression filters, for example common or differential mode throttles. From the point of view of EMC, it would therefore be advantageous to use Y capacitors CyF+, CyF−, CyL+, CyL− with large capacitance values.

However, the disadvantage of an electrified vehicle 2, in other words, for example, an electric vehicle or hybrid vehicle, is that an energy content of the Y capacitors CyF+, CyF−, CyL+, CyL− is noticeable to a vehicle user if they can touch a high-voltage potential HV+, HV− and are at the same time connected to the earth potential. They then get an electric shock. Depending on the size of this electric shock, it may be a health risk. For example, it may cause ventricular fibrillation or death. Such an electric shock constitutes what is referred to as a "single fault" and should be avoided. Therefore, this energy content of the Y capacitors CyF+, CyF−, CyL+, CyL− is limited through standards in order to rule out any danger to the vehicle user.

From the point of view of high-voltage safety, small capacitance values of the Y capacitors CyF+, CyF−, CyL+, CyL− are therefore advantageous. Under the standards set out, for example, in provision LV123, a maximum energy content, in particular, of 0.2 J, must not be exceeded in the Y capacitors CyF+, CyF−, CyL+, CyL−, or what are referred to as "alternative measures" must be provided, for example greater insulation. However, the inevitable consequence of this is that, when coupling two high-voltage systems, for example the vehicle 2 and the DC charging station 5, if greater insulation is chosen as the "alternative measure", both parts involved must at the same time always have this greater insulation. However, this cannot currently be guaranteed.

Under other standards, for example SAE J1772, IEC 60479-1 and IEC60479-2, the energy content of the Y capacitors CyF+, CyF−, CyL+, CyL− is not mentioned as a variable which is a health risk and which should not be exceeded, a charge quantity instead being mentioned as a harmful mechanism which should not exceed a specified value. For example, a graph showing the relationship between the duration of a body current $IR_K$ and the value of the body current $IR_K$ is also provided. An alternative way like, for example, greater insulation is not accepted here.

FIG. 1 shows a circuit configuration of an embodiment of the electrical DC grid 1 configured as a high-voltage grid in a DC charging process for the vehicle 2. The DC grid 1 therefore comprises the high-voltage on-board electrical system 3 of the vehicle 2 and the DC charging station 5 connected thereto by means of a charging cable 4. In the example shown, the charging cable 4 is already connected to connection contacts AK+, AK− of a DC charging connection of the vehicle 2 and charging protections LS+, LS− of the vehicle 2 in high-voltage potential lines HV+L, HV−L are still open.

On the left there is the DC charging station 5 with a charging station voltage source 8, a charging station internal resistor $R_{LS}$ and the Y capacitors CyL+, CyL−.

Shown next these on the right is the charging cable 4.

Shown next to that on the right is the vehicle 2 with its high-voltage on-board electrical system 3 comprising the charging protections LS+, LS−, the Y capacitors CyF+, CyF−, for example the EMC filter, an X capacitor Cx, for example of a DC intermediate circuit, and the high-voltage battery 6 with its main protections HS+, HS−. The high-voltage battery 6 is shown as an electric battery energy source 7 comprising, for example, a plurality of individual cells electrically connected in series and/or in parallel, with a battery internal resistor $R_{Batt}$.

Also shown in this circuit diagram is the human body MK with a body resistor $R_K$ and a switch symbol for an insulation fault IF, for example in the event of a defective charging cable 4, here, for example, a fault on the positive potential HV+. The insulation fault IF may likewise occur on the negative potential HV−. This is not shown here. If the insulation fault IF occurs, the switch symbol is closed. In the event of such an insulation fault IF and contact between the human body MK and one of the high-voltage potentials HV+, HV− and a reference potential M, discharge takes place through the human body MK.

In order to avoid this discharge through the human body MK or at least reduce it to a permissible level, in particular in terms of any health risk, a protection device 8 with a protection circuit 9 is provided to reduce the electric shock by the Y capacitors CyF+, CyF−, CyL+, CyL−. In the example shown, the protection device 8 comprises a first voltage measuring device SV1 between the positive potential line HV+L and the reference potential line ML for measuring a voltage between the positive potential line HV+L and the reference potential line ML, in other words between the positive potential HV+ and the reference potential M, in particular the mass potential, in particular the vehicle shell, and a second voltage measuring device SV2 between the negative potential line HV−L and the reference potential line ML for measuring a voltage between the negative potential line HV−L and the reference potential line ML, in other words between the negative potential HV− and the reference potential M, in particular the mass potential, in particular the vehicle shell.

Alternatively, in an embodiment not shown, the first voltage measuring device may be disposed between an HV potential (HV− or HV+) and the reference potential M and the respective second voltage measuring device may be disposed between the two HV potentials (HV− and HV+).

The voltage measurements, in particular the voltage measuring devices SV1, SV2, actuate an associated protection switch SS1, SS2 if a specified voltage value has been undershot. The protection switches SS1, SS2 are, for example, each configured as semiconductor switches, for example MOSFETs. As a result, a discharge network is connected between the positive potential HV+ and the reference potential M, in particular the shell, or a discharge network is connected between the negative potential HV− and the reference potential M, in particular the shell. In the example shown, these discharge networks are protection circuit parts 9.1, 9.2 of the protection circuit 9.

The respective discharge network, in other words the respective protection circuit part 9.1, 9.2, preferably consists of an uncharged capacitor, referred to below as the protection capacitor Cs, Cs1, Cs2, and a resistor electrically connected in parallel, referred to below as the discharge resistor Re, Re1, Re2. Also provided is a protection resistor Rs, Rs1, Rs2 which is electrically connected in series to the protection capacitor Cs, Cs1, Cs2. It is also possible, for example, for only the discharge resistor Re, Re1, Re2 to be provided, but the latter would have to be of very low resistance in order to rapidly reduce the body current $IR_K$. However, the disadvantage of this is that low-resistance insulation faults would therefore occur. As a result, only the combination of protection capacitor Cs, Cs1, Cs2 and discharge resistor Re, Re1, Re2 is considered below.

The respective Re, Re1, Re2 ensures that the protection capacitor Cs, Cs1, Cs2 electrically connected in parallel was voltage-free at the time of connection. After connection, it ensures rapid discharging of the Y capacitors CyF+, CyF−, CyL+, CyL− of the high-voltage potential HV+, HV− concerned. In the example shown, according to FIG. 1, the protection device 8 is shown disposed with the protection circuit 9 in the vehicle 2. However, it may also be disposed with the same function in the DC charging station 5.

Figure 2:
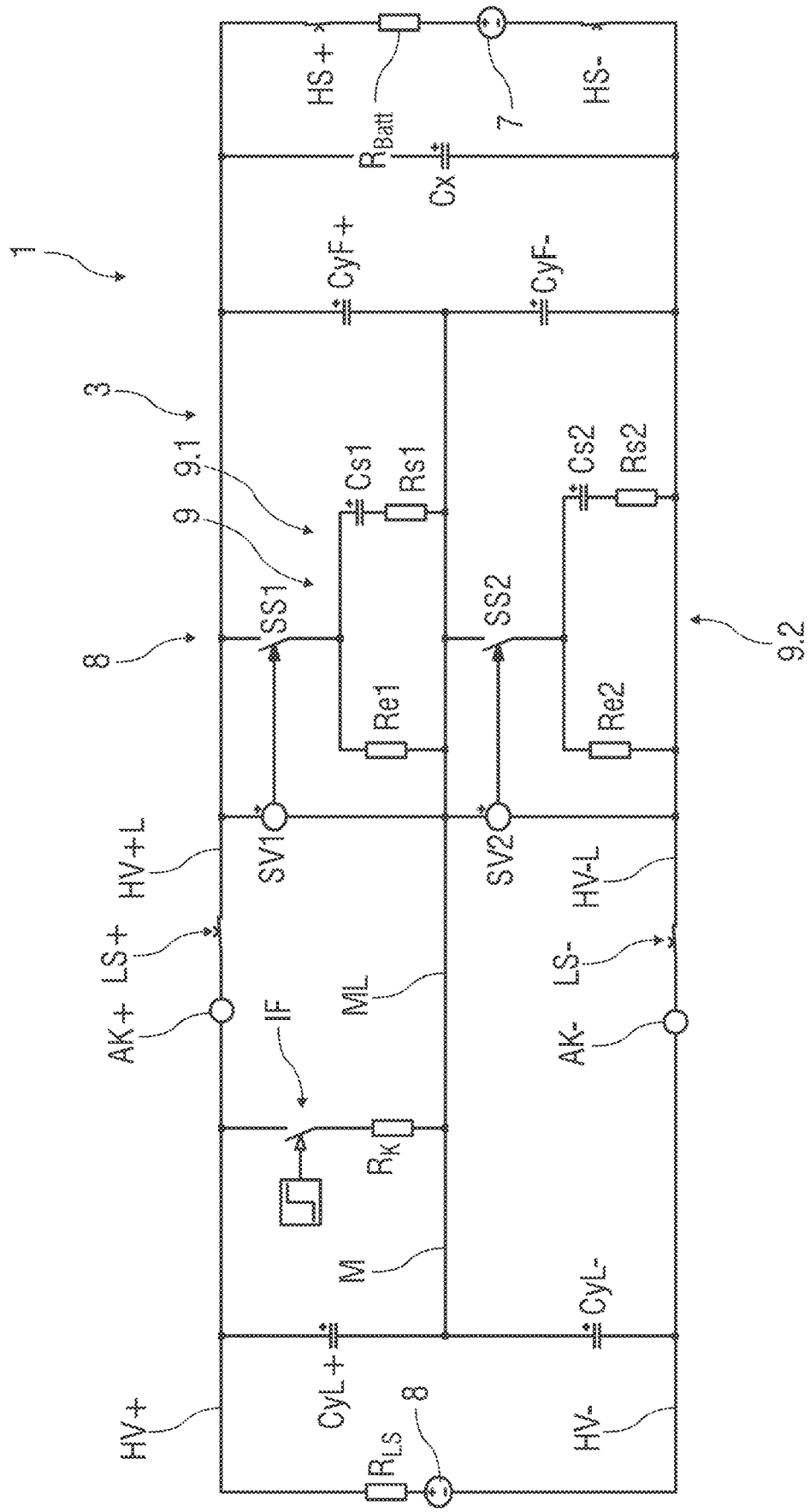
FIG. 2 shows a schematic view of a mode of operation of the protection device from FIG. 1.

FIG. 2 shows a mode of operation of the protection device 8, in particular of the protection circuit 9, in particular of the respective protection circuit part 9.1, 9.2. Fault detection takes place via the voltage measurement with respect to the reference potential M.

Although the high-voltage potentials HV+, HV− do not necessarily have to be distributed symmetrically with respect to the reference potential M during the DC charging process, an insulation value of the high-voltage potentials HV+, HV− which must at least be met compared to the reference potential M, for example more than 100 ohms/volt, has to be ensured. If the person touches a high-voltage potential HV+, HV−, this results in a reduction in insulation resistance and, as a result thereof, a shift in the high-voltage potentials HV+, HV− with respect to the reference potential M.

Although an insulation monitor in the vehicle 2 or in the DC charging station 5 cyclically checks the insulation resistances, the length of time that passes before an insulation fault IF is detected, at up to 30 seconds in the vehicle 2 or up to two minutes in the DC charging station 5, is far too long to be able to constitute any protection against a shock to the person from the energy stored in the Y capacitors CyF+, CyF−, CyF+, CyF− if any insulation is missing.

The mode of operation of the protection device 8 with its protection circuit 9 for reducing a Cy shock focuses, for example, on the limit values with regard to the risk potential described under the standards SAE J1772, IEC 60479-1 and IEC60479-2. The charge quantity which flows through the human body MK and is shown in a diagram is mentioned as being a harmful mechanism here. The aim is therefore to detect and reduce the body current $IR_K$ as rapidly as possible in order to minimize the charge flowing. Merely actuating the mechanical charging protections LS+, LS− and/or main protections HS+, HS− would be too slow for this.

In the protection circuit 9 described above, a fall in the insulation value is rapidly detected by the voltage measurement and as a result the discharged protection capacitor Cs, Cs1, Cs2 is immediately connected in parallel, for example via a hardware circuit, to the high-voltage potential HV+, HV− concerned with the body resistor $R_K$ or the Y capacitor CyF+, CyF−, CyL+, CyL−. The voltage therefore suddenly reduces over this high-voltage potential HV+, HV− and the reference potential M. The flow of current through the human body MK falls proportionally to the reduction in the voltage.

The discharge resistor Re, Re1, Re2 has two functions here. On the one hand, it ensures that the protection capacitor Cs, Cs1, Cs2 is fully discharged before it is connected. On the other, after connection, it speeds up the reduction of the already reduced voltage between this high-voltage potential HV+, HV− and the reference potential M, as a result of which the current through the human body MK is also reduced again with further declining voltage. The other high-voltage potential HV−, HV+ respectively increases its voltage to the same degree with respect to the reference potential M, but it is not touched by the human body MK and is therefore non-critical. In a further step, the main protections HS+, HS− of the high-voltage battery 6 are advantageously opened, protections in the DC charging station 5 and/or the charging protections LS+, LS− are opened and, in a final step, the X capacitor Cx and the Y capacitors CyF+, CyF− of the vehicle 2 are actively discharged.

Figure 3:
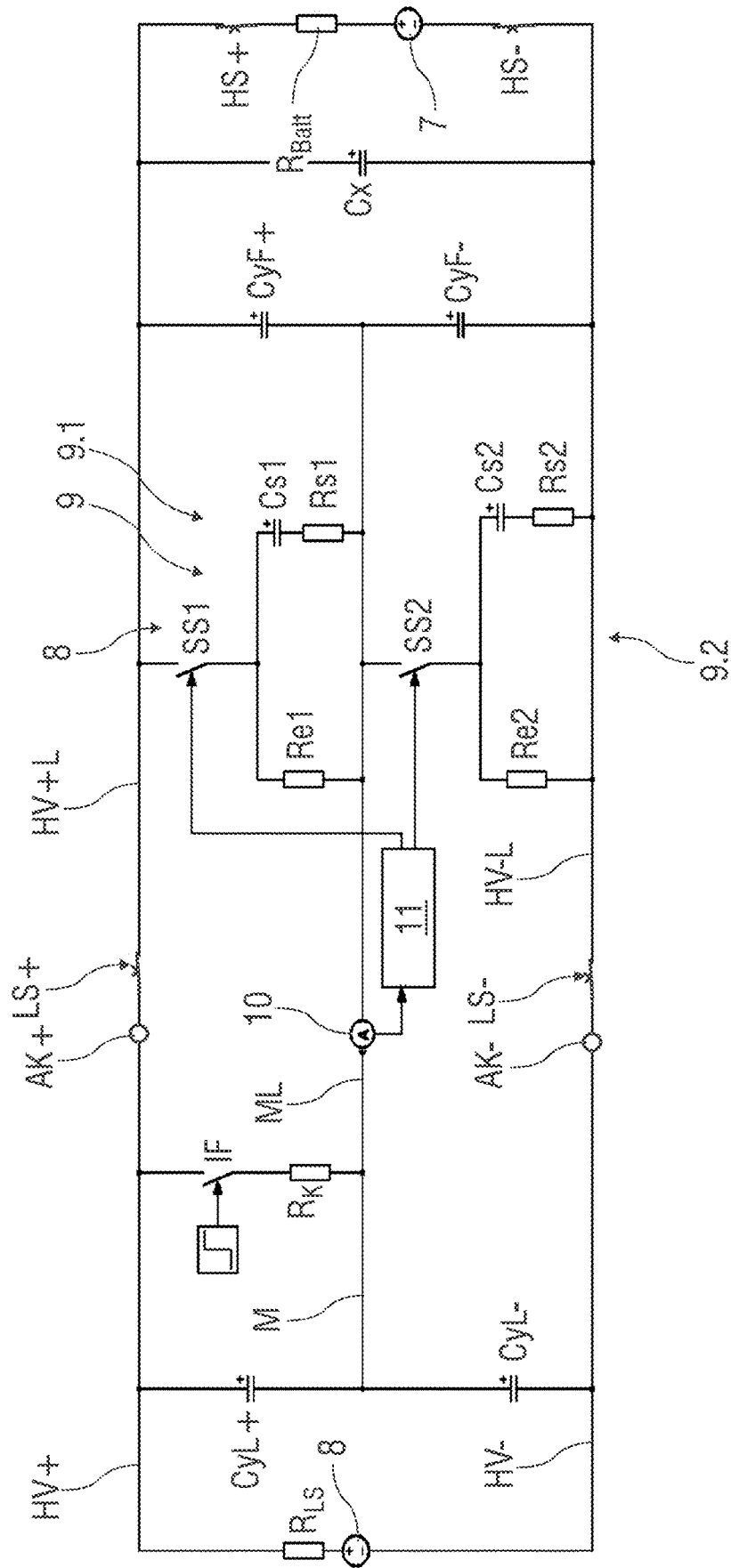
FIG. 3 shows a schematic view of an alternative protection device.

FIG. 3 shows an alternative fault detection via a fault current measurement by means of a fault-current measuring device 10. Instead of faults being detected via a voltage measurement of the respective high-voltage potential HV+, HV− with respect to the reference potential M, fault current detection can also be used. For this purpose, the protection device 8 comprises the fault-current measuring device 10 in the reference potential line ML. The first protection switch SS1 and/or the second protection switch SS2 can be actuated so as to close in the event of a fault current measured by means of the fault-current measuring device 10 and are therefore accordingly actuated and thereby closed in such a case. Provision is advantageously made here for a current evaluation unit 11 coupled to the fault-current measuring device 10 and the protection switches SS1, SS2 for evaluating the measured fault current and for actuating the first protection switch SS1 and/or the second protection switch SS2 depending on the measured fault current.

However, this method is more difficult because the relatively high charging DC has to be analysed for a very low fault current. In the event of a fault current, it is also necessary to distinguish between common mode and normal mode interference since the output current from the DC charging station 5 likewise contains what is referred to as a ripple current, in other words an AC part.

Fault detection via voltage measurement is therefore easier to carry out and advantageous. Fault detection by mean of voltage measurement is therefore described in more detail below.

Specified standards, for example standard IEC 60479-1, can be met by the protection device 8 with its protection circuit 9. The higher the DC charge voltage, the higher the given voltage over the Y capacitors CyF+, CyF−, CyL+, CyL−. With an assumed body resistor $R_K$, this also results in a higher current proportionally to the voltage of the Y capacitors CyF+, CyF−, CyL+, CyL− on initial contact. The current through the body decreases over the course of discharge of the capacitor over a resistor, in particular in the form of an exponential function. The current on initial contact is calculated on the basis of the voltage and resistance quotient. At an assumed maximum charge voltage of 920 V, with a high-voltage potential distribution with respect to the reference potential M (460 V over each Y capacitor) likewise assumed to be symmetrical, this gives an initial value of the contact current of 460 V/1,200 ohms=383 mA. Starting from this initial value of the current, this current can be converted to a sinusoidal AC current through division by the square root of 6. This corresponds to the value on the X-axis in what is referred to as the C1 characteristic curve under standard SAE J 1772. The duration of this current can be ascertained by calculating the time constant of the capacitor charging t=R×C. The corresponding duration (Y-axis) corresponds here to 3×t. For example, a dwell time in this state of approx. 100 ms is still permissible. A residual body current $IR_K$ of less than 5 mA has been selected as a target, in other words the residual voltage must be less than 6 V.

The higher the voltage over a Y capacitor CyF+, CyF−, CyL+, CyL−, for example in the case of an asymmetrical high-voltage potential distribution with respect to the reference potential M, the shorter the maximum dwell time. A current over 500 mA is not allowed since a maximum voltage of 600 V over a Y capacitor CyF+, CyF−, CyL+, CyL− would occur here. Above this, the charging process must be discontinued.

Using the protection device 8 with its protection circuit 9, it is therefore possible to calculate whether it is still able comply with the maximum current durations required. If this condition is not met, the charging process must immediately be discontinued since a further fault would lead to a risk of personal injury. Input variables for this calculation are voltage measurements over the Y capacitors CyF+, CyF−, CyL+, CyL− of both high-voltage potentials HV+, HV−, knowledge of the actual reaction speed of the circuit and the value table showing the maximum permissible current dwell times.

Figure 4:
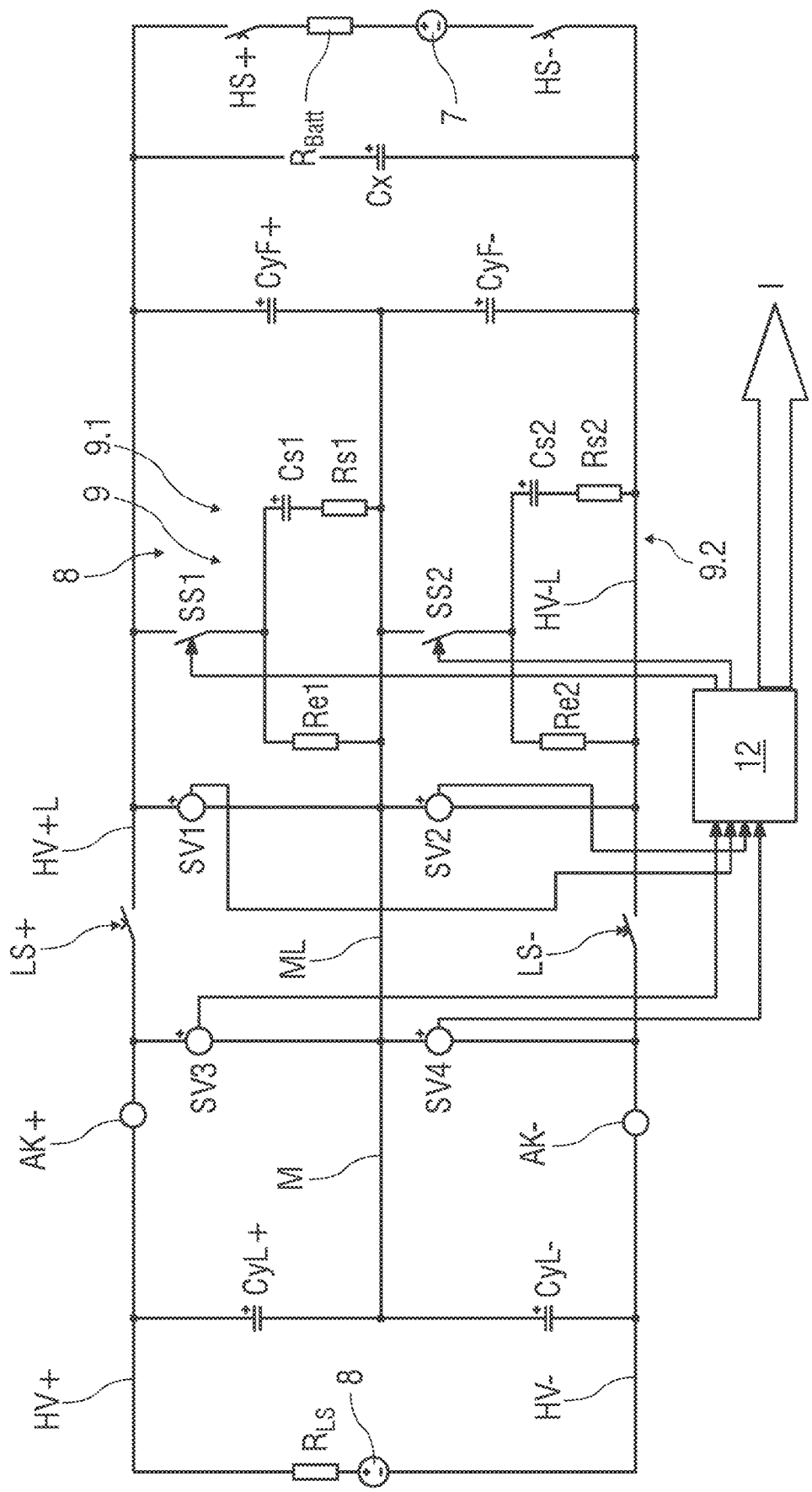
FIG. 4 shows a schematic view of a further embodiment of a DC grid with a protection device.

FIG. 4 shows the determination of a safe or unsafe operating state. The circuit has for this purpose been extended by adding two further voltage measuring devices SV3, SV4. Therefore, even before connection of the charging protections LS+, LS− and before the increasing of the capacitance of the Y capacitors CyF+, CyF−, CyL+, CyL− inevitably associated therewith as a result of the parallel connection of the DC charging station 5 and the vehicle 2, it is possible to tell whether the protection circuit 9 would be able to keep within legal limit values in the event of faulty insulation, for example in the charging cable 4. Ideally, what is referred to protection adhesive detection of the vehicle 2 is used for all four voltage measurements. However, this is conditional upon the maximum time delay before connection of the protection capacitor Cs, Cs1, Cs2 not being exceeded when evaluating the voltage. As a result, this is advantageously carried out using hardware and no evaluation is carried out via a microprocessor.

Provision is made here for a voltage evaluation unit 12 in which voltages detected by means of the voltage measuring devices SV1 to SV4 are evaluated and the protection switches SS1, SS2 can be actuated accordingly. Provision may also be made here for this voltage evaluation unit 12 to emit further information I, in particular to slower control devices or to the DC charging station 5. Examples of information I are an opening or closing of the charging protections LS+, LS−, a discontinuation of the DC charging process, an opening or closing of the main protections HS+, HS− of the high-voltage battery 6, an initiation of the active discharging of the high-voltage intermediate circuit of the vehicle 2 and/or information I that everything is in order and the DC charging process can therefore be started.

Figure 5:
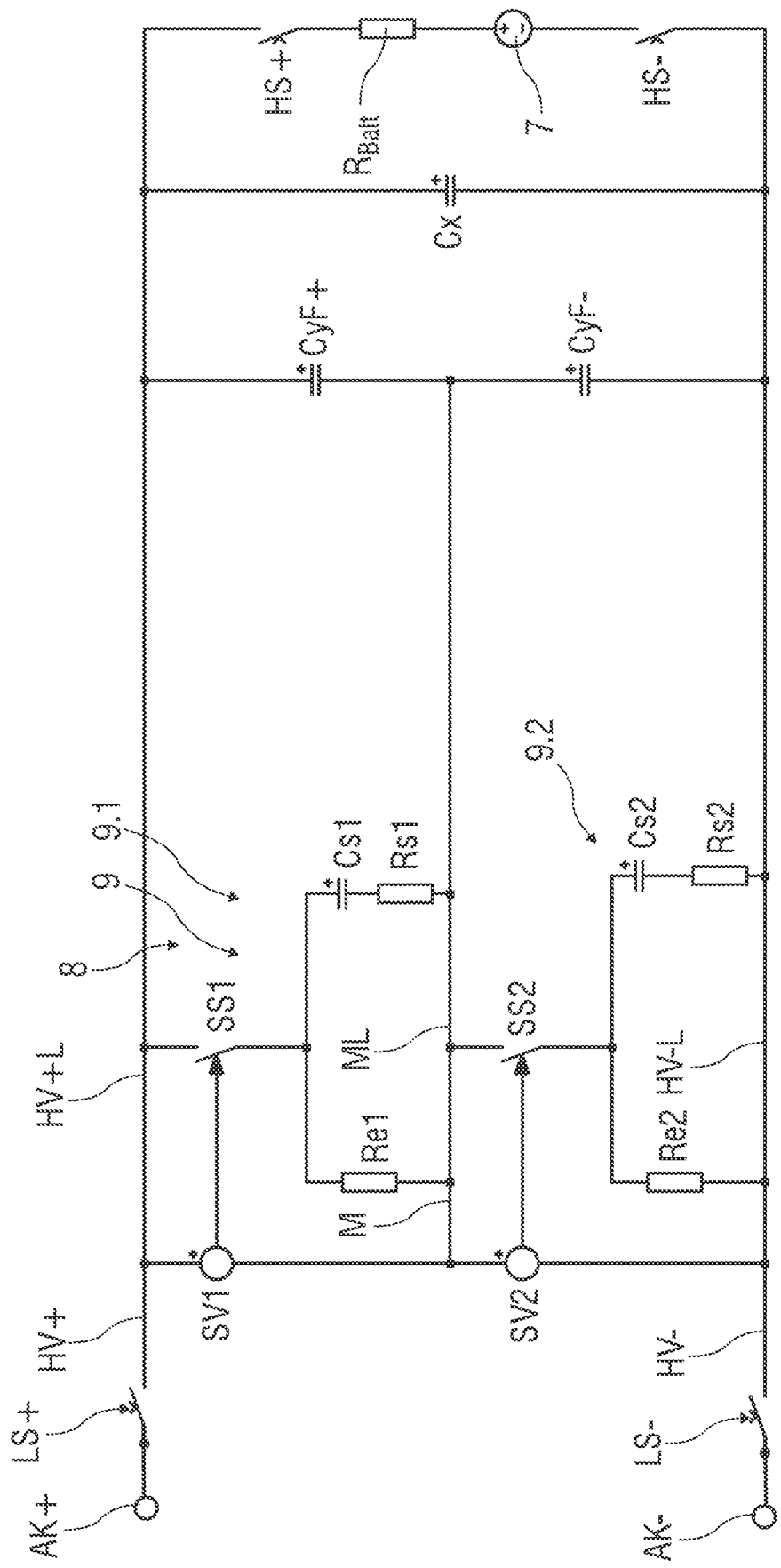
FIG. 5 shows a schematic view of a further embodiment of a DC grid with a protection device.

FIG. 5 shows the DC grid 1 without the DC charging station 5, in particular for a driving operation of the vehicle 2, an AC charging operation and for fitting and servicing work. The only difference from the state in the case of DC charging is that there is no DC charging station 5. For example, a defective high-voltage cable or a defective housing of a high-voltage electronic system as a result of an accident is considered to be a fault mechanism. The protection device 8 with its protection circuit 9 can reduce the charge quantity even if damage is caused to the high-voltage system during fitting or servicing.

The protection circuit 9 for reducing the Y shock caused by an insulation fault IF remains exactly the same as described above. For this purpose, the protection device 8 with its protection circuit 9 is of course disposed in the vehicle 2. The function is exactly the same as described above for the fault in the insulation during DC charging. With the detection of the reduction of the voltage between one of the high-voltage potentials HV+, HV− and the reference potential M, the respective protection capacitor Cs, Cs1, Cs2 is connected and the total capacitance of the Y capacitors CyF+, CyF−, CyL+, CyL− of the high-voltage potential HV+, HV− concerned is discharged. An opening of the main protections HS+, HS− of the high-voltage battery 6 is also advantageously ordered and an active discharging of the X capacitor Cx and both Y capacitors CyF+, CyF− of the vehicle 2 is initiated. The charging protections LS+, LS− have already been opened beforehand and remain open.

Simulation of a discharging of the Y capacitors CyF+, CyF−, CyL+, CyL− as a result of faulty insulation during DC charging at a DC charging station 5 with a fault at the positive potential HV+ is described below. The voltage of the DC charging station 5 is 920 V. The battery voltage of the high-voltage battery 6 is 915 V. All insulation resistances are 1 Mohms. The capacitance of the Y capacitors CyL+, CyL− of the charging station 5 is in each case 500 nF. The capacitance of the Y capacitors CyF+, CyF− of the vehicle 2 is in each case 1000 nF. The body resistor $R_K$ is 1200 ohms. The first discharge resistor Re1 of the first protection circuit part 9.1 is 1200 ohms. The capacitance of the first protection capacitor Cs1 of the first protection circuit part 9.1 is 200 μF. The first protection resistor Rs1 of the first protection circuit part 9.1 is 1 ohm.

At time t=0.05 seconds, the body resistor $R_K$ is connected between the positive potential HV+ and the reference potential M by closing the switch showing the insulation fault IF. As soon as the voltage between the positive potential HV+ and the reference potential M falls below 350 V, the first protection switch SS1 is closed and the discharge network, in other words the first protection circuit part 9.1, is connected.

The simulation is based on the target value of less than 5 mA after connection of the first protection capacitor Cs1. This is because there is no time limit for this value. However, if a larger body current $IR_K$ which can be reduced more rapidly through the discharge resistors Re, Re1, Re2 is allowed as the target value, then a significant reduction of the respective protection capacitor Cs, Cs1, Cs2 would be possible.

Figure 6:
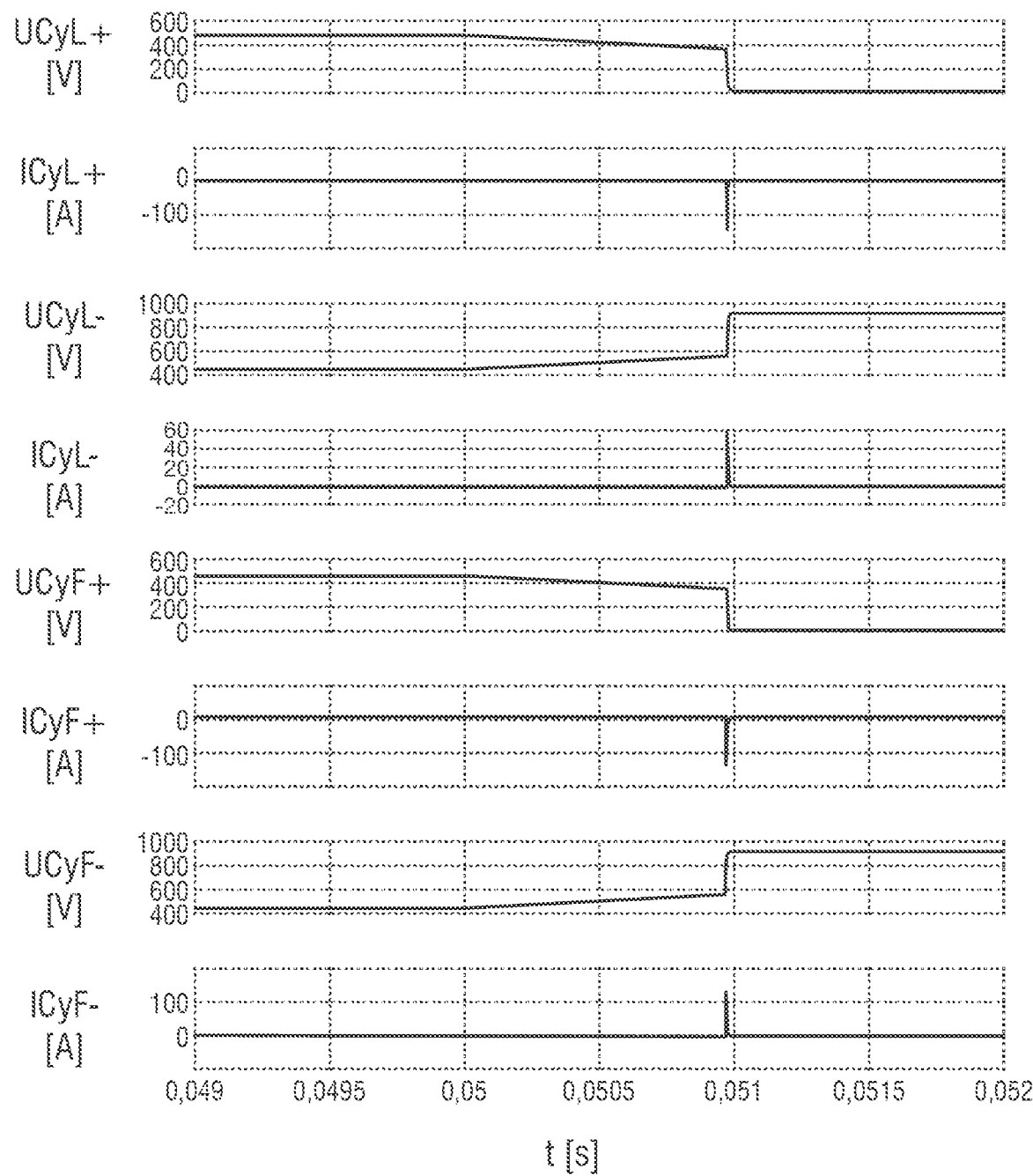
FIG. 6 shows a schematic view of the results of a simulation.
Figure 7:
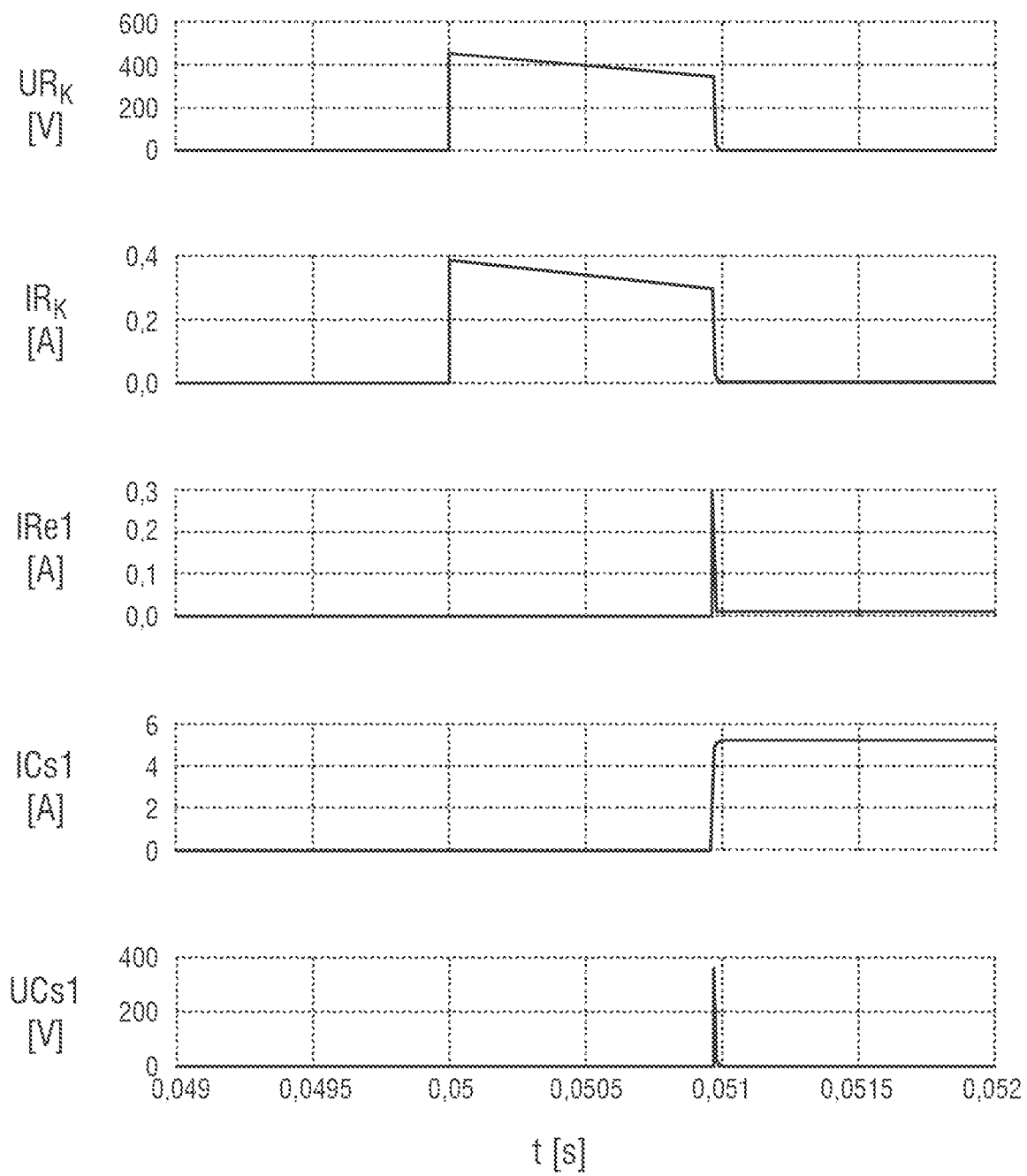
FIG. 7 shows a schematic view of the results of a simulation.
Figure 8:
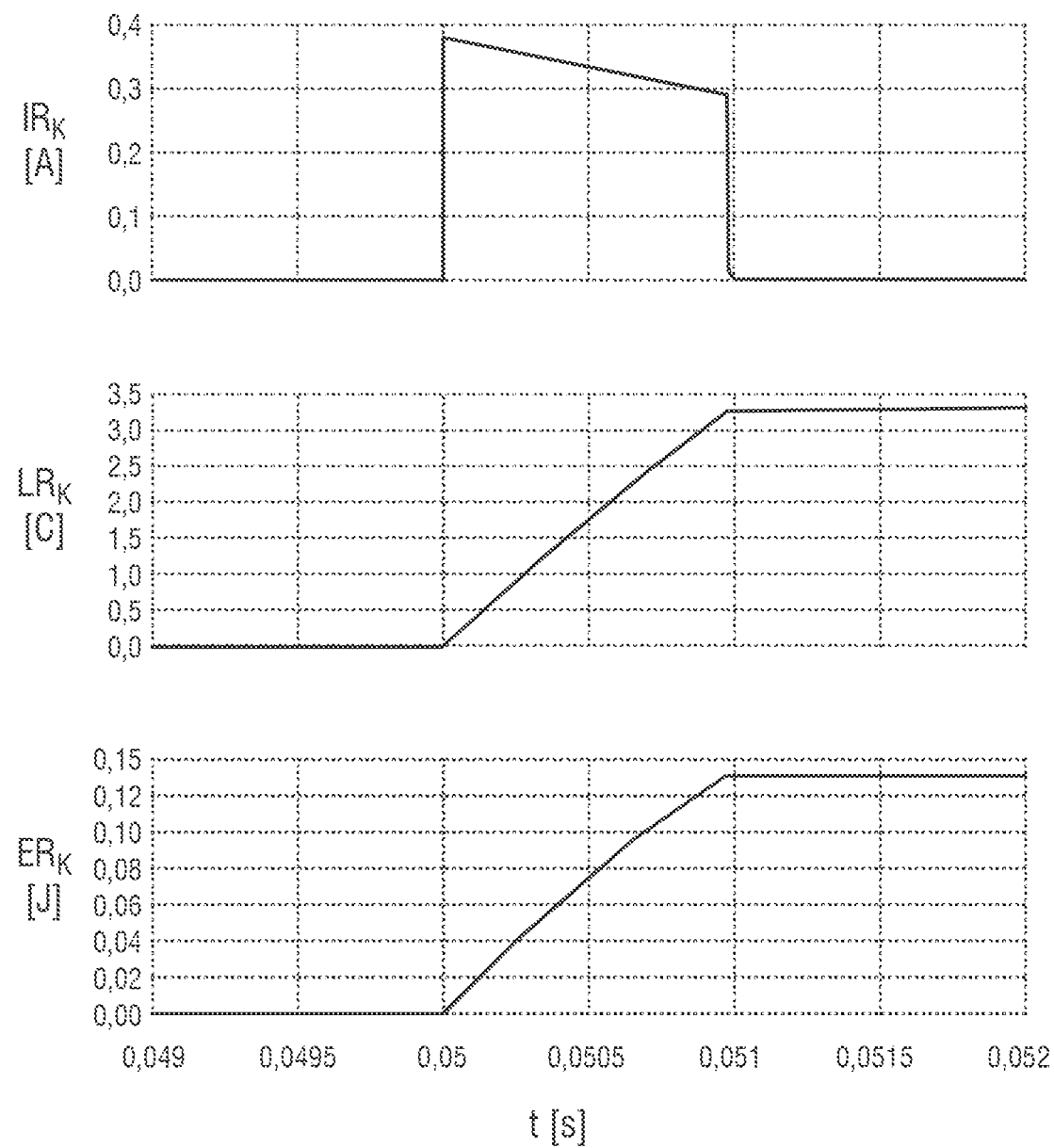
FIG. 8 shows a schematic view of the results of a simulation.

FIGS. 6 to 8 show the simulation results. FIG. 6 shows the voltages UCyF+, UCyF−, UCyL+, UCyL− and currents ICyF+, ICyF−, ICyL+, ICyL− of the Y capacitors CyL+, CyL−, CyF+, CyF− of the DC charging station 5 and of the vehicle 2 over time t. The body resistor $R_K$ is connected at time t=0.05 s. A transfer of capacitances takes place which cannot be detected in the currents on this scale, but is clearer in the diagram of the body current $IR_K$ in FIG. 7. However, the transfer can be seen in the voltages UCyF+, UCyF−, UCyL+, UCyL− of the Y capacitors CyL+, CyL−, CyF+, CyF−. The first protection capacitor Cs1 is connected from time t=approx. 0.051 s. This leads to an almost immediate discharging of the Y capacitors CyL+, CyF+. A residual voltage at time t=approx. 0.0515 s is 5.2 V. The transfer current (approx. 60 A-130 A depending on the potential) is determined by the first protection resistor Rs1. After the transfer of the high-voltage potentials HV+, HV− by the protection capacitor Cs1, in other words after approx. 0.051 s, the voltage over the negative potential HV− and the reference potential M is 911.4 V.

FIG. 7 shows the voltage $UR_K$ (over the body resistor $R_K$, its current $IR_K$, the current IRe1 of the first discharge resistor Re1 and the current ICs1 and the voltage UCs1 of the first protection capacitor Cs1. When the fault occurs, the body current $IR_K$ is 383 mA. It declines on an exponential function until connection of the first protection switch SS1 to a value of approx. 292 mA. After connection of the first protection switch SS1, if the voltage between the positive potential HV+ and the reference potential M is less than 350 V, the body current $IR_K$ falls to a value of approx. 4.3 mA (at t=approx. 0.051 s), this then likewise declining on an exponential function. When the first protection switch SS1 is connected, the current ICs1 in the first protection capacitor Cs1 corresponds to the sum of the currents ICyF+, ICyF−, ICyL+, ICyL− of all Y capacitors CyL+, CyL−, CyF+, CyF−. It is approx. 350 A.

FIG. 8 again shows the current $IR_K$ of the body resistor $R_K$ and the charge $LR_K$ flowing through the body resistor $R_K$ and the energy $ER_K$ transferred over the body resistor $R_K$. The charge $LR_K$ is approx. 0326 C at time t=approx. 0.051 s and increases only very slightly thereafter. The energy $ER_K$ transferred via the body resistor $R_K$, at 0.131 J, is lower than the maximum value of 0.2 J required under standard LV123. Although this maximum value actually applies to the energy stored in the Y capacitors CyF+, CyF−, CyL+, CyL−, it is assumed that this energy content discharges in the human body MK and is not limited by a protection circuit 9. As a result, this protection circuit 9 may also constitute an "alternative measure".

Figure 9:
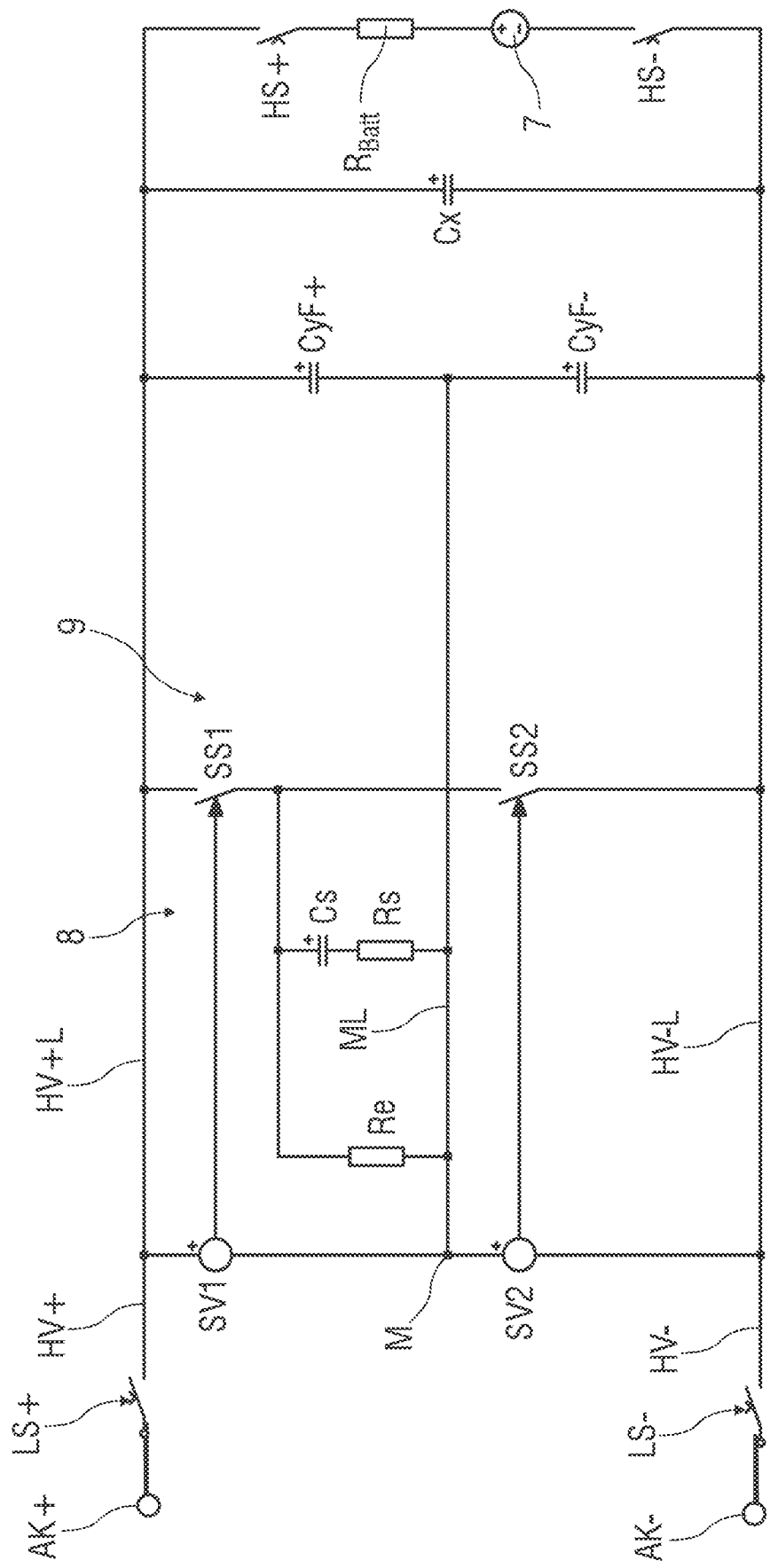
FIG. 9 shows a schematic view of a component-optimized protection circuit.

FIG. 9 shows a component-optimized protection circuit 9. In the case of the protection circuit 9 for reducing a Cy shock, it is to be assumed that only one high-voltage potential HV+, HV− over the body resistor $R_K$ is connected to the reference potential M, for example the chassis ground. If both high-voltage potentials HV+, HV− were connected to the reference potential M, in particular the chassis ground, this would equate to a short circuit of the high-voltage battery 6 or DC charging station 5 which has to be separated by a fuse or a current sensor with a cut-off device controlled thereby.

It is clear herefrom that the protection circuit 9 for reducing a Cy shock is never used at the same time for the positive potential HV+ and the negative potential HV−. As a result, a single protection capacitor Cs, a discharge resistor Re and also a protection resistor Rs can be used for protecting both high-voltage potentials HV+, HV−, as shown in FIG. 9. There is therefore no need for two protection circuit parts 9.1, 9.2. The voltage measurements by means of the two voltage measuring devices SV1, SV2 and the two protection switches SS1, SS2 for connecting the protection circuit 9 have to be maintained. FIG. 9 shows such component optimization. This is useful if the discharge resistor Re likewise has to assume greater component values owing, for example, to high operating voltages or large capacitances of the Y capacitors CyF+, CyF−, CyL+, CyL− in the vehicle 2 and the DC charging station 5.

Figure 10:
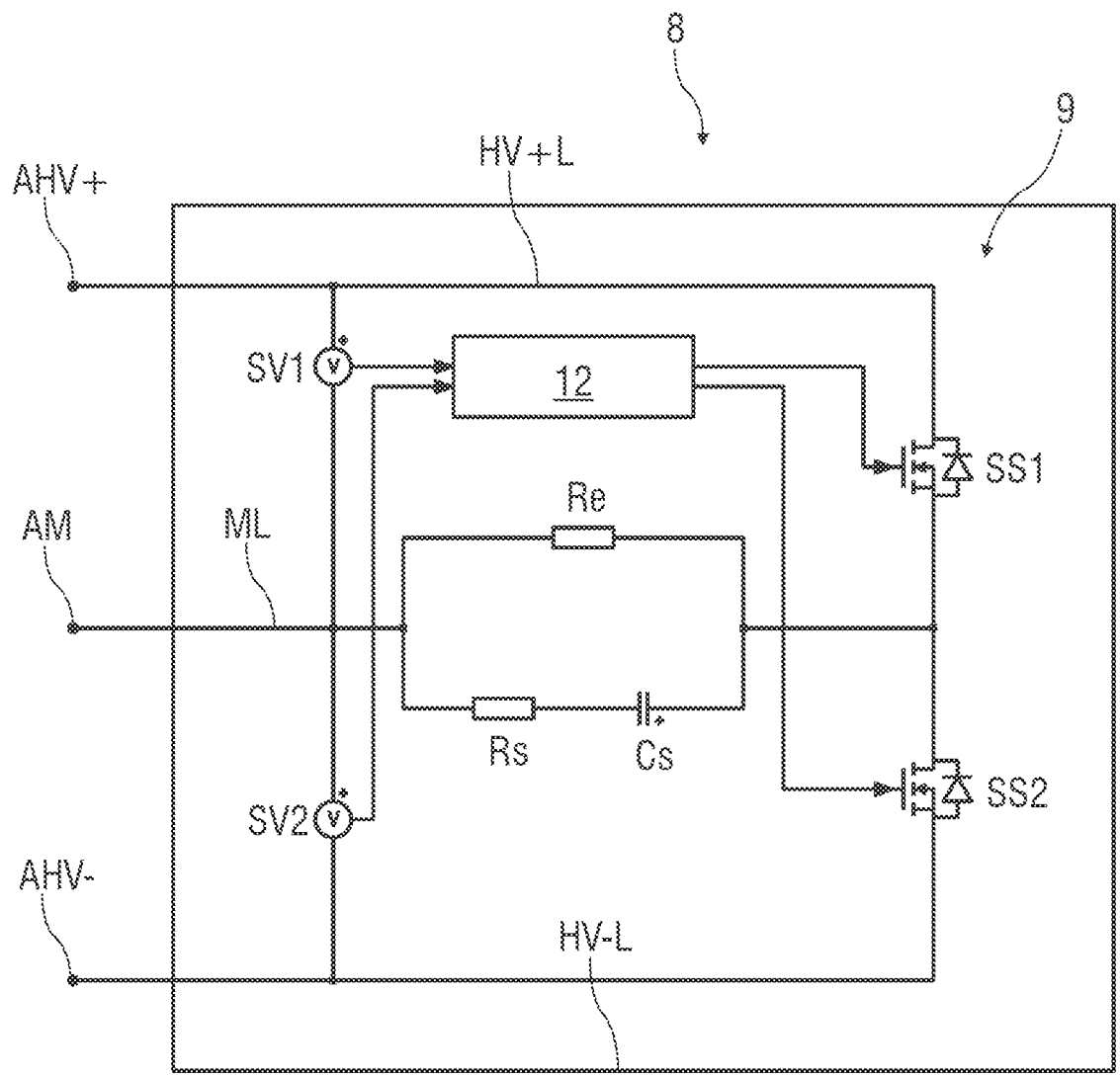
FIG. 10 shows a schematic view of a protection device.

FIG. 10 shows an embodiment of the protection device 8, in particular with the component-optimized protection circuit 9, in other words without the two protection circuit parts 9.1, 9.2. The protection switches SS1, SS2 are in each case configured here as MOSFETs, but other semiconductor switches are also possible, for example IGBTs or thyristors. The protection device 8, in particular its protection circuit 9, is reduced here to the necessary additional outlay that is to be integrated in the vehicle 2 or the DC charging station 5. Connections AHV+, AHV−, AM to the positive potential HV+, negative potential HV− and reference potential M can be kept very small since a current only flows in milliseconds in the event of a fault. Otherwise, the connections AHV+, AHV−, AM are current-free and serve only for voltage measurement. It follows herefrom that it is possible to integrate the protection device 8 with its protection circuit 9 into an existing high-voltage system quickly with few alterations. If more planning time is available, this function can of course also be integrated into an existing device.

Figure 11:
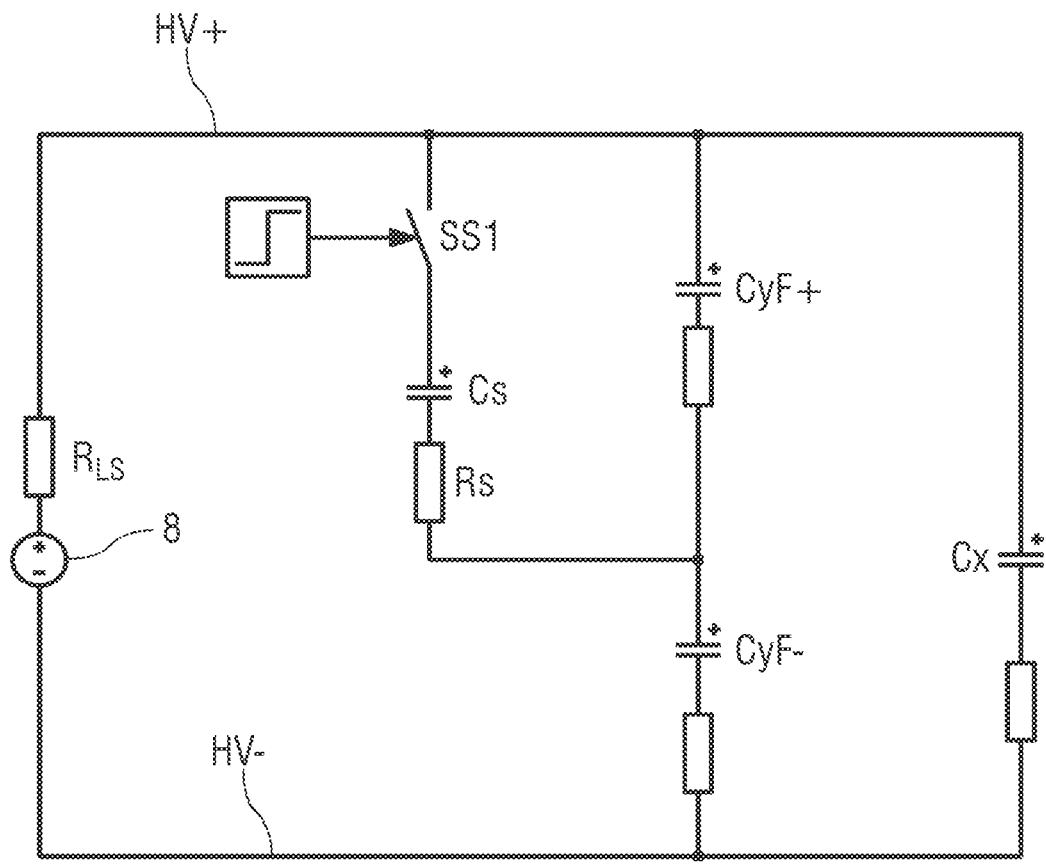
FIG. 11 shows a schematic view of a mode of operation of a protection circuit.

FIG. 11 shows the mode of operation of voltage reduction through the addition of a capacitor, here the protection capacitor Cs, to an existing capacitive voltage divider. The capacitive voltage divider corresponds to the Y capacitors CyF+, CyF− in the vehicle 2 and in DC charging. The discharged capacitor added corresponds to the protection capacitor Cs. Up until time t<0.5 s, there is a voltage division between the positive potential HV+ and the negative potential HV− over the series circuit of both Y capacitors CyF+, CyF−. Both Y capacitors CyF+, CyF− are the same size, for example 1 µF, as a result of which the high-voltage potentials HV+, HV− divide symmetrically with respect to the reference potential M.

A desired voltage in this example is 400 V. This voltage falls over each Y capacitor CyF+, CyF− since the voltage of the source is twice the desired voltage, that is to say 800 V. At time t=0.5 s, the first protection switch SS1 is switched on, as a result of which the protection capacitor Cs with 10 µF is connected in parallel to the Y capacitor CyF+ of the positive potential HV+ and the overall capacitance therefore increases to 11 µF. Through the capacitive voltage divider with the Y capacitor CyF− of the negative potential HV−, the voltage between the positive potential HV+ and the reference potential M is therefore reduced to approx. 67 V, whilst the voltage over the Y capacitor CyF− of the negative potential HV− rises to 733 V. The voltage over the X capacitor Cx always remains constant at 800 V.

The desired voltage after connection of the protection capacitor Cs can be adjusted by dimensioning the protection capacitor Cs compared to the Y capacitors CyF+, CyF−. The larger the protection capacitor Cs compared to the Y capacitors CyF+, CyF−, the smaller the residual voltage left.

Figure 12:
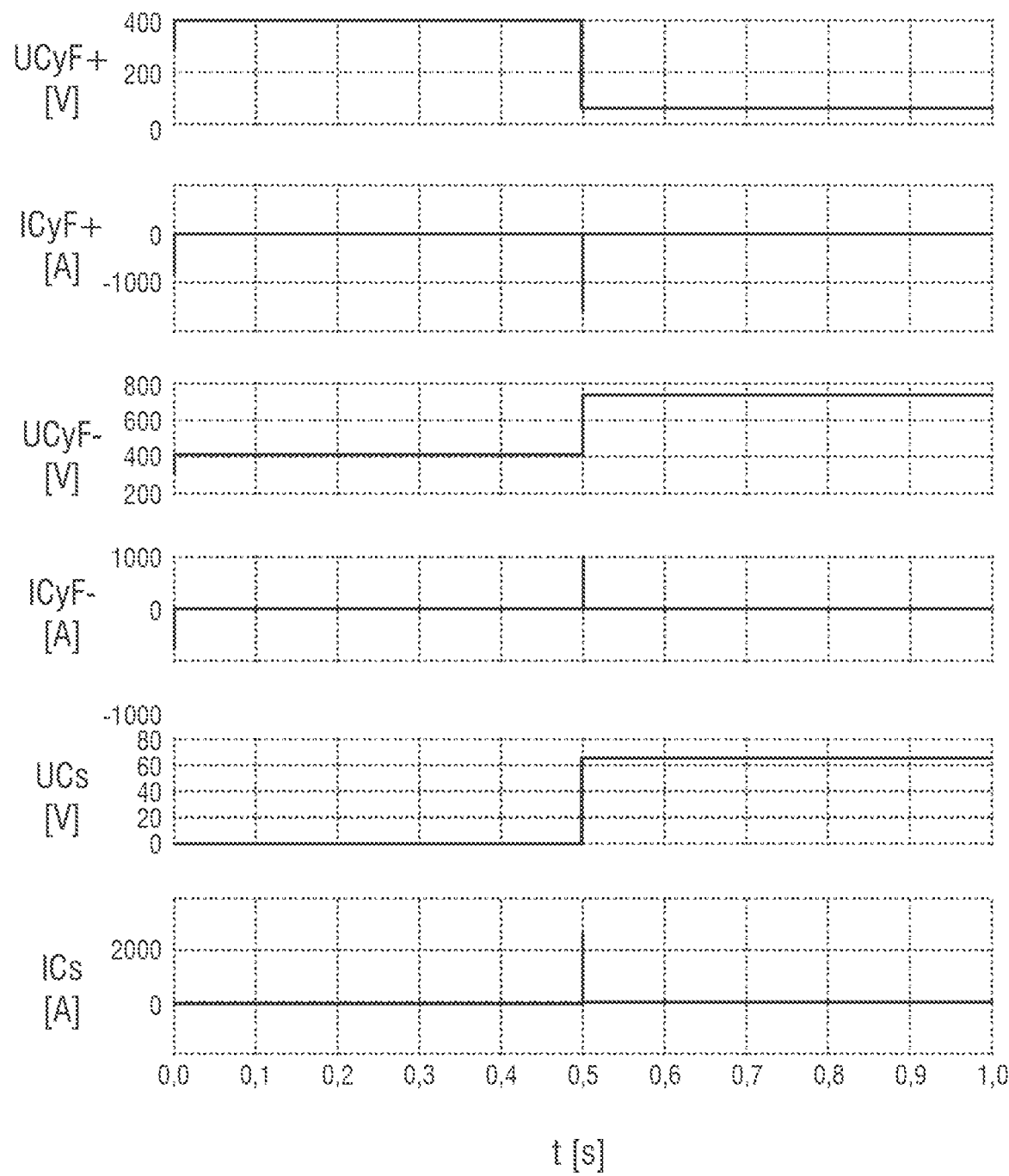
FIG. 12 shows a schematic view of voltages and currents over time in the mode of operation shown in FIG. 11.

FIG. 12 shows the voltages UCyF+, UCyF−, UCs1 and currents ICyF+, ICyF−, ICs1 of the Y capacitors CyF+, CyF− and of the protection capacitor Cs resulting from the process shown in FIG. 11, over time.

The protection device 8 therefore comprises the first voltage measuring device SV1 between the positive potential line HV+L and the reference potential line ML for measuring the voltage between the positive potential line HV+L and the reference potential line ML and the second voltage measuring device SV2 between a negative potential line HV−L and the reference potential line ML for measuring the voltage between the negative potential line HV−L and the reference potential line ML.

The protection device 8 also comprises the protection circuit 9. The protection circuit 9 comprises one electric series circuit consisting of the discharge resistor Re and of the first protection switch SS1 between the positive potential line HV+L and the reference potential line ML and the electric series circuit of the, in other words the same, discharge resistor Re and of the second protection switch SS2 between the negative potential line HV−L and the reference potential line ML, as shown in FIGS. 9 and 10.

Alternatively, the protection circuit 9 comprises two protection circuit parts 9.1, 9.2, wherein the first protection circuit part 9.1 comprises the electric series circuit consisting of the first discharge resistor Re1 and of the first protection switch SS1 between the positive potential line HV+L and the reference potential line ML, and the second protection circuit part 9.2 comprises the electric series circuit consisting of the second discharge resistor Re2 and of the second protection switch SS2 between the negative potential line HV−L and the reference potential line ML, as shown in FIGS. 1 to 5.

In both variations of the protection circuit 9 of the protection device 8, the first protection switch SS1 can be actuated so as to close if the first voltage measuring device SV1 ascertains that the specified voltage value has been undershot, and the second protection switch SS2 can be actuated so as to close if the second voltage measuring device SV2 ascertains that the specified voltage value has been undershot.

Alternatively to the two voltage measuring devices SV1, SV2, provision may be made for a fault-current measuring device 10 in the reference potential line ML, as shown in FIG. 3. Then, in both variations of the protection circuit 9, the first protection switch SS1 and/or the second protection switch SS2 can be actuated so as to close in the event of a fault current measured by means of the fault-current measuring device 10.

As already mentioned above, the protection capacitor Cs, Cs1, Cs2, is advantageously electrically connected in parallel to the discharge resistor Re, Re1, Re2, in other words the sole protection capacitor Cs is electrically connected in parallel to the sole discharge resistor Re, as shown in FIGS. 9 and 10, or the respective protection capacitor Cs1, Cs2 is electrically connected in parallel to the discharge resistor Re1, Re2 of the respective protection circuit part 9.1, 9.2, as shown in FIGS. 1 to 5.

The protection circuit 9 therefore comprises the electric series circuit consisting of the discharge resistor Re and the first protection switch SS1 between the positive potential line HV+L and the reference potential line ML and the electric series circuit consisting of the discharge resistor Re and the second protection switch SS2 between the negative potential line HV−L and the reference potential line ML, wherein the protection capacitor Cs is electrically connected in parallel to the discharge resistor Re, as shown in FIGS. 9 and 10. Alternatively, the protection circuit 9 comprises both protection circuit parts 9.1, 9.2, wherein the first protection circuit part 9.1 comprises the electric series circuit consisting of the first discharge resistor Re1 and the first protection switch SS1 between the positive potential line HV+L and the reference potential line ML, wherein the first protection capacitor Cs1 is electrically connected in parallel to the first discharge resistor Re1, and wherein the second protection circuit part 9.2 comprises the electric series circuit consisting of the second discharge resistor Re2 and the second protection switch SS2 between the negative potential line HV−L and the reference potential line ML, wherein the second protection capacitor Cs2 is electrically connected in parallel to the second discharge resistor Re2, as shown in FIGS. 1 to 5.

In the examples shown here, the protection capacitor Cs, Cs1, Cs2 is not only electrically connected in parallel to the discharge resistor Re, Re1, Re2, but an electric series circuit consisting of the protection capacitor Cs, Cs1, Cs2 and a protection resistor Rs, Rs1, Rs2 is electrically connected in parallel.

The protection circuit 9 therefore comprises the electric series circuit consisting of the discharge resistor Re and the first protection switch SS1 between the positive potential line HV+L and the reference potential line ML and the electric series circuit consisting of the discharge resistor Re and the second protection switch SS2 between the negative potential line HV−L and the reference potential line ML, wherein the electric series circuit consisting of the protection capacitor Cs and the protection resistor Rs is electrically connected in parallel to the discharge resistor Re, as shown in FIGS. 9 and 10. Alternatively, the protection circuit 9 comprises both protection circuit parts 9.1, 9.2, wherein the first protection circuit part 9.1 comprises the electric series circuit consisting of the first discharge resistor Re1 and the first protection switch SS1 between the positive potential line HV+L and the reference potential line ML, wherein the electric series circuit consisting of the first protection capacitor Cs1 and the first protection resistor Rs1 is electrically connected in parallel to the first discharge resistor Re1, and wherein the second protection circuit part 9.2 comprises the electric series circuit consisting of the second discharge resistor Re2 and the second protection switch SS2 between the negative potential line HV−L and the reference potential line ML, wherein the electric series circuit consisting of the second protection capacitor Cs2 and the second protection resistor Rs2 is electrically connected in parallel to the second discharge resistor Re2, as shown in FIGS. 1 to 5.

For example, a first voltage evaluation unit coupled to the first voltage measuring device SV1 and the first protection switch SS1 is provided for evaluating a voltage ascertained by the first voltage measuring device SV1 and for actuating the first protection switch SS1 if the specified voltage limit value has been undershot, and a second voltage evaluation unit coupled to the second voltage measuring device SV2 and the second protection switch SS2 is provided for evaluating a voltage ascertained by the second voltage measuring device SV2 and for actuating the second protection switch SS2 if the specified voltage limit value has been undershot.

Alternatively, for example, as shown in FIG. 4, a joint voltage evaluation unit 12 coupled to the voltage measuring devices SV1, SV2 and the protection switches SS1, SS2 is provided for evaluating the voltage ascertained by the first voltage measuring device SV1 and the voltage ascertained by the second voltage measuring device SV2 and for actuating the first protection switch SS1 if the specified voltage limit value has been undershot by the voltage ascertained by the first voltage measuring device SV1 and for actuating the second protection switch SS2 if the specified voltage limit value has been undershot by the voltage ascertained by the second voltage measuring device SV2.

If the fault-current measuring device 10 is used, provision is accordingly made, for example, for a current evaluation unit 11 coupled to the fault-current measuring device 10 and the protection switches SS1, SS2 for evaluating the measured fault current and for actuating the first protection switch SS1 and/or the second protection switch SS2 depending on the measured fault current.

In one possible embodiment, as shown in FIG. 4, provision may be made for the joint voltage evaluation unit 12 to be coupled to a third voltage measuring device SV3 and to a fourth voltage measuring device SV4, wherein the third voltage measuring device SV3 is disposed between the positive potential line HV+L and the reference potential line ML for measuring a voltage between the positive potential line HV+L and the reference potential line ML, and the fourth voltage measuring device SV4 is disposed between the negative potential line HV−L and the reference potential line ML for measuring a voltage between the negative potential line HV−L and the reference potential line ML, and wherein a first switch unit, here in the form of the charging protection LS+ in the positive potential line HV+L, is disposed in the positive potential line HV+L between a point of connection to the first voltage measuring device SV1 and a point of connection to the third voltage measuring device SV3, and a second switch unit, here in the form of the charging protection LS− in the negative potential line HV−L, is disposed in the negative potential line HV−L between a point of connection to the second voltage measuring device SV2 and a point of connection to the fourth voltage measuring device SV4.

Advantageous possible uses of the protection device 8 are described below. In vehicles 2 with a high-voltage system in the 800 V range, it is difficult to comply with the limit values for discharging through Y capacitors CyF+, CyF−, CyL+, CyL− required under the standards. This particularly applies to already existing vehicles 2 which do not allow adjustments in the high-voltage system for large additional components owing to the already occupied construction space in the vehicle 2. The solution described is useful here since it can be installed easily, inexpensively and with little need for construction space in the vehicle 2.

Regulations, in particular based on standards, are also met by the solution described, thus making it easier to register the vehicle 2 or making it possible to register it at all. Through this protection device 8 and its protection circuit 9, with the addition of a small electronic system, the limit values are reached without anything having to be modified in terms of the high-voltage system and its components.

The maximum energy content of 0.2 J required under LV123 is already exceeded at 632 V by the DC charging station 5. "Alternative measures" are therefore essential. Double insulation is currently being discussed as the only solution. All coupled systems, in other words the vehicle 2 and the DC charging station 5, then simultaneously have to have greater insulation, which cannot currently be guaranteed. However, through the protection device 8 and its protection circuit 9, the energy flowing through the human body MK can likewise be kept to a value below 0.2 J. It therefore constitutes a further solution for "alternative measures".

The protection device 8 and its protection circuit 9 make it possible, if there is any damaged insulation, for example if there is a damaged charging plug or charging cable 4, to reduce the dangerous discharge current from Y capacitors CyF+, CyF−, CyL+, CyL− if touched by a person during DC charging. If there is any damaged insulation, the dangerous discharge current is likewise reduced if touched by a person in all other vehicle states.

It is also possible to improve EMC interference through a larger configuration of the Y capacitors CyF+, CyF−, CyL+, CyL−. It is possible to dispense with the need for double insulation for the entire high-voltage system. This applies to the vehicle 2 and the DC charging station 5.

The protection device 8 with its protection circuit 9 may be disposed in the vehicle 2 and/or in the DC charging station 5.

LIST OF REFERENCE CHARACTERS

1 DC grid
2 Vehicle
3 High-voltage on-board electrical system
4 Charging cable
5 DC charging station
6 High-voltage battery
7 Battery energy source
8 Protection device
9 Protection circuit
9.1, 9.2 Protection circuit part
10 Fault-current measuring device
11 Current evaluation unit
12 Voltage evaluation unit
AHV+, AHV−, AM Connection
AK+, AK− Connection contact
Cs, Cs1, Cs2 Protection capacitor
Cx X capacitor
CyF+, CyF− Y capacitor vehicle
CyL+, CyL− Y capacitor DC charging station
$ER_K$ Energy
HS+, HS− Main protection
HV+, HV− High-voltage potential
HV+L, HV−L High-voltage potential line
I Information
ICs1 Current first protection capacitor
ICyF+, ICyF− Current Y capacitor vehicle
ICyL+, ICyL− Current Y capacitor DC charging station
IF Insulation fault
IRe1 Current first discharge resistor
$IR_K$ Current body resistor
$LR_K$ Charge
LS+, LS− Charge protection
M Reference potential
ML Reference potential line
MK Human body
$R_{Batt}$ Battery internal resistor
Re, Re1, Re2 Discharge resistor
$R_K$ Body resistor
$R_{LS}$ Charging station internal resistor
Rs, Rs1, Rs2 Protection resistor
SS1, SS2 Protection switch
SV1, SV2, SV3, SV4 Voltage measuring device
t Time
UCs1 Voltage first protection capacitor
UCyF+, UCyF− Voltage Y capacitor vehicle
UCyL+, UCyL− Voltage Y capacitor DC charging station
$UR_K$ Voltage body resistor

The invention claimed is:

1. A protection device (8) for an electric DC grid (1), comprising:
a first voltage measuring device (SV1) between a positive potential line (HV+L) and a reference potential line (ML) for measuring a voltage between the positive potential line (HV+L) and the reference potential line (ML) and a second voltage measuring device (SV2) between a negative potential line (HV−L) and the reference potential line (ML) for measuring a voltage between the negative potential line (HV−L) and the reference potential line (ML), or a fault-current measuring device (10) in the reference potential line (ML); and
a protection circuit (9) comprising:
an electric series circuit consisting of a discharge resistor (Re) and a first protection switch (SS1) between the positive potential line (HV+L) and the reference potential line (ML) and an electric series circuit consisting of the discharge resistor (Re) and a second protection switch (SS2) between the negative potential line (HV−L) and the reference potential line (ML); or
a first protection circuit part (9.1) and a second protection circuit part (9.2), wherein the first protection circuit part (9.1) comprises an electric series circuit consisting of a first discharge resistor (Re1) and a first protection switch (SS1) between the positive potential line (HV+L) and the reference potential line (ML) and wherein the second protection circuit part (9.2) comprises an electric series circuit consisting of a second discharge resistor (Re2) and a second protection switch (SS2) between the negative potential line (HV−L) and the reference potential line (ML);
wherein:
the first protection switch (SS1) can be actuated to close if the first voltage measuring device (SV1) ascertains that a specified voltage value has been undershot and/or can be actuated to close if the second voltage measuring device (SV2) ascertains that a specified voltage value has been exceeded and the second protection switch (SS2) can be actuated to close if the second voltage measuring device (SV2) ascertains that the specified voltage value has been undershot and/or can be actuated to close if the first voltage measuring device (SV1) ascertains that a specified voltage value has been exceeded; or
the first protection switch (SS1) and/or the second protection switch (SS2) can be actuated to close in an event of a fault current measured by the fault-current measuring device (10).

2. The protection device (8) according to claim 1, wherein a protection capacitor (Cs, Cs1, Cs2) is electrically connected in parallel to the discharge resistor (Re, Re1, Re2).

3. The protection device (8) according to claim 2, wherein an electric series circuit consisting of the protection capacitor (Cs, Cs1, Cs2) and a protection resistor (Rs, Rs1, Rs2) is electrically connected in parallel to the discharge resistor (Re, Re1, Re2).

4. The protection device (8) according to claim 1, further comprising:
a first voltage evaluation unit coupled to the first voltage measuring device (SV1) and the first protection switch (SS1) for evaluating a voltage ascertained by the first voltage measuring device (SV1) and for actuating the first protection switch (SS1) if the specified voltage limit value has been undershot, and a second voltage evaluation unit coupled to the second voltage measuring device (SV2) and the second protection switch (SS2) for evaluating a voltage ascertained by the second voltage measuring device (SV2) and for actuating the second protection switch (SS2) if the specified voltage limit value has been undershot; or a first voltage evaluation unit coupled to the first voltage measuring device (SV1) and the second protection switch (SS2) for evaluating a voltage ascertained by the first voltage measuring device (SV1) and for actuating the second protection switch (SS2) if the specified voltage limit value is exceeded, and a second voltage evaluation unit coupled to the second voltage measuring device (SV2) and the first protection switch (SS1) for evaluating a voltage ascertained by the second voltage measuring device (SV2) and for actuating the first protection switch (SS1) if the specified voltage limit value is exceeded; or a current evaluation unit (11) coupled to the fault-current measuring device (10) and the protection switches (SS1, SS2) for evaluating the measured fault current and for actuating the first protection switch (SS1) and/or the second protection switch (SS2) depending on the measured fault current; or a joint voltage evaluation unit (12) coupled to the voltage measuring devices (SV1, SV2) and the protection switches (SS1, SS2) for evaluating the voltage ascertained by the first voltage measuring device (SV1) and the voltage ascertained by the second voltage measuring device (SV2) and for actuating the first protection switch (SS1) if the specified voltage limit value has been undershot by the voltage ascertained by the first voltage measuring device (SV1) or second voltage measuring device (SV2) and for actuating the second protection switch (SS2) if the specified voltage limit value has been undershot by the voltage ascertained by the second voltage measuring device (SV2) or first voltage measuring device (SV1).

5. The protection device (8) according to claim 4, wherein:
the joint voltage evaluation unit (12) is coupled to a third voltage measuring device (SV3) and to a fourth voltage measuring device (SV4), wherein the third voltage measuring device (SV3) is disposed between the positive potential line (HV+L) and the reference potential line (ML) for measuring a voltage between the positive potential line (HV+L) and the reference potential line (ML), wherein the fourth voltage measuring device (SV4) is disposed between the negative potential line (HV−L) and the reference potential line (ML) for measuring a voltage between the negative potential line (HV−L) and the reference potential line (ML), wherein a first switch unit is disposed in the positive potential line (HV+L) between a point of connection to the first voltage measuring device (SV1) and a point of connection to the third voltage measuring device (SV3), and wherein a second switch unit is disposed in the negative potential line (HV−L) between a point of connection to the second voltage measuring device (SV2) and a point of connection to the fourth voltage measuring device (SV4).

6. The protection device (8) according to claim 1, wherein the first and second protection switches (SS1, SS2) are a respective semiconductor switch.

7. An on-board electrical system (3) for a vehicle (2), comprising:
the protection device (8) according to claim 1.

8. A DC charging station (5), comprising:
the protection device (8) according to claim 1.

* * * * *